US012259715B2

United States Patent
Donelan et al.

(10) Patent No.: US 12,259,715 B2
(45) Date of Patent: Mar. 25, 2025

(54) OPEN APPLICATION INTERFACE FOR INDUSTRIAL EQUIPMENT

(71) Applicant: Illinois Tool Works Inc., Glenview, IL (US)

(72) Inventors: Michael E. Donelan, Upton, MA (US); Linfeng Liu, Suzhou (CN); John Anthony Cronin, Franklin, MA (US)

(73) Assignee: Illinois Tool Works Inc., Glenview, IL (US)

( * ) Notice: Subject to any disclaimer, the term of this patent is extended or adjusted under 35 U.S.C. 154(b) by 101 days.

(21) Appl. No.: 17/511,735

(22) Filed: Oct. 27, 2021

(65) Prior Publication Data

US 2023/0126456 A1  Apr. 27, 2023

(51) Int. Cl.
*G05B 19/418* (2006.01)

(52) U.S. Cl.
CPC ..... *G05B 19/4185* (2013.01); *G05B 19/4183* (2013.01); *G05B 19/4188* (2013.01)

(58) Field of Classification Search
CPC .................................................... G05B 19/418
USPC .......................................................... 700/96
See application file for complete search history.

(56) References Cited

U.S. PATENT DOCUMENTS

| | | | |
|---|---|---|---|
| 6,754,551 B1 | 6/2004 | Zohar et al. | |
| 7,046,383 B1 * | 5/2006 | Ueda | H04N 1/2338 358/1.14 |
| 7,117,504 B2 | 10/2006 | Smith et al. | |
| 7,324,861 B1 | 1/2008 | Zheng | |
| 7,475,472 B2 | 1/2009 | Haarberg et al. | |
| 8,145,341 B2 | 3/2012 | Jaroszewski et al. | |
| 9,060,437 B2 | 6/2015 | Bloom et al. | |
| 2001/0046862 A1 | 11/2001 | Coppinger et al. | |

(Continued)

FOREIGN PATENT DOCUMENTS

| | | | | |
|---|---|---|---|---|
| CN | 205787658 U | * | 12/2016 | |
| CN | 108092884 A | * | 5/2018 | ............. H04L 12/66 |

(Continued)

OTHER PUBLICATIONS

Definition for "standardized protocols", https://www.GeeksforGeeks.org/protocol-and-standard-in-computer-network (Year: 2023).*

(Continued)

*Primary Examiner* — Hien D Khuu
(74) *Attorney, Agent, or Firm* — Lando & Anastasi, LLP

(57) ABSTRACT

An open application protocol for industrial equipment is disclosed. Disclosed techniques include: opening a connection between (a) an open application associated with a manufacturing execution system and (b) an instance of a data sharing interface operating on an industrial machine used in a surface mounting process, the open application being configured to communicate with any machine that implements the data sharing interface, regardless of machine type or manufacturer; discovering, by the open application via the connection, discoverable information associated with the industrial machine, the discoverable information including one or more of data items, events, commands, or alarms; and controlling, by the open application via the connection, operation of the industrial machine to control at least a portion of the surface mounting process.

14 Claims, 4 Drawing Sheets

(56) References Cited

U.S. PATENT DOCUMENTS

| | | | |
|---|---|---|---|
| 2002/0007422 A1* | 1/2002 | Bennett | H04L 41/0213 709/246 |
| 2003/0023336 A1 | 1/2003 | Kreidler et al. | |
| 2003/0059964 A1 | 3/2003 | Kawai et al. | |
| 2005/0071996 A1 | 4/2005 | Ray | |
| 2006/0000871 A1* | 1/2006 | Wang | H05K 3/1216 228/8 |
| 2007/0046283 A1 | 3/2007 | Onishi et al. | |
| 2008/0152411 A1 | 6/2008 | Konig et al. | |
| 2010/0122633 A1 | 5/2010 | Doyle | |
| 2010/0122634 A1* | 5/2010 | Doyle | H05K 13/0061 101/126 |
| 2010/0125359 A1* | 5/2010 | Doyle | H05K 13/0061 700/114 |
| 2011/0067024 A1 | 3/2011 | Chiu et al. | |
| 2013/0192482 A1* | 8/2013 | Bloom | H05K 3/1216 101/127 |
| 2022/0255805 A1* | 8/2022 | Hausermann | G06N 20/00 |

FOREIGN PATENT DOCUMENTS

| | | | |
|---|---|---|---|
| CN | 112150125 A | * | 12/2020 |
| DE | 102020127123 A1 | * | 4/2022 |

OTHER PUBLICATIONS

P. Peniak and M. Franekova, "Open communication protocols for integration of embedded systems within Industry 4," 2015 International Conference on Applied Electronics (AE), Pilsen, Czech Republic, 2015, pp. 181-184. (Year: 2015).*

Michael Ford, I Connect007—Good for the Industry, How Do I Get Smart With IPC CFX? (Part 1), Jul. 30, 2019, 8 pages.

Michael Ford, I Connect007—Good for the Industry, How Do I Get Smart With IPC CFX? (Part 2), Jul. 31, 2019, 7 pages.

The Hermes Standard: The new backbone for board-flow data management in Smart SMT Factories, IPC-HERMES-9852, Oct. 27, 2021, www.the-hermes-standard.info, 51 pages.

Wikipedia, CAMX, Jan. 28, 2021, 2 pages Retrieved from: https://en.wikipedia.org/w/index.php?title=CAMX&oldid=1003375149.

Wikipedia, Manufacturing execution system, Apr. 16, 2021, 5 pages Retrieved from: https://en.wikipedia.org/w/index.php?title=Manufacturing_execution_system&oldid=1018059127.

Wikipedia, SECS/GEM, Apr. 9, 2021, 2 pages Retrieved from: https://en.wikipedia.org/w/index.php?title=SECS/GEM&oldid=1016852699.

* cited by examiner

OPEN APPLICATION INTERFACE FOR INDUSTRIAL EQUIPMENT

BACKGROUND

In many industrial processes, there is a need to obtain data from and control equipment used in those processes. For example, there is a need to obtain data from and control equipment used in electronic assembly processes. Such equipment may include, for example, one or more printers, fluid dispensers, reflow ovens, selective solder equipment, etc. Various communications protocols exist for obtaining data from and controlling equipment. Examples of such protocols used in electronic assembly include: Generic Equipment Model (GEM); Computer-Aided Manufacturing Using Extensible Markup Language (XML) (CAMX); Connected Factory Initiative (CFX); Hermes; and custom Manufacturing Execution System (MES) interfaces developed by various electronics manufacturers. In general, these protocols are incompatible with each other, thus impeding interoperability of equipment that does not use the same protocol(s).

Approaches described in this section have not necessarily been conceived and/or pursued prior to the filing of this application. Accordingly, unless otherwise indicated, approaches described in this section should not be construed as prior art.

TECHNICAL FIELD

The present disclosure relates generally to controlling industrial equipment.

SUMMARY

In general, in one aspect, one or more non-transitory computer-readable media store instructions that, when executed by one or more processors, cause the one or more processors to perform operations for controlling at least part of a surface mounting process, the operations including: opening a first connection between (a) an open application associated with a manufacturing execution system and (b) a first instance of a data sharing interface operating on a first industrial machine used in the surface mounting process, the open application being configured to communicate with any machine that implements the data sharing interface, regardless of machine type or manufacturer; discovering, by the open application via the first connection, first discoverable information associated with the first industrial machine, the first discoverable information including one or more of data items, events, commands, or alarms; and controlling, by the open application via the first connection, operation of the first industrial machine to control at least a first portion of the surface mounting process. The first industrial machine may be one of a stencil printer, a dispenser, a pick-and-place machine, a reflow oven, a wave solder machine, or a selective solder machine.

The operations may further include: opening a second connection between (a) the open application associated with the manufacturing execution system and (b) a second instance of the data sharing interface operating on a second industrial machine used in the surface mounting process; discovering, by the open application via the second connection, second discoverable information associated with the second industrial machine, the second discoverable information including one or more of data items, events, commands, or alarms; and controlling, by the open application via the second connection, operation of the second industrial machine to control at least a second portion of the surface mounting process. The first industrial machine and the second industrial machine may be provided by different manufacturers. The first industrial machine and the second industrial machine may be different kinds of machines.

Controlling operation of the first industrial machine may include setting a value of a data item defined in the first discoverable information, at least by transmitting the value of the data item to the first instance of the data sharing interface.

Controlling operation of the first industrial machine may include executing a command defined in the first discoverable information, at least by transmitting an instruction to execute the command to the first instance of the data sharing interface.

In general, in one aspect, a system for controlling at least part of a surface mounting process includes at least one device including a hardware processor. The system is configured to perform operations for controlling at least part of the surface mounting process, the operations including: opening a first connection between (a) an open application associated with a manufacturing execution system and (b) a first instance of a data sharing interface operating on a first industrial machine used in the surface mounting process, the open application being configured to communicate with any machine that implements the data sharing interface, regardless of machine type or manufacturer; discovering, by the open application via the first connection, first discoverable information associated with the first industrial machine, the first discoverable information including one or more of data items, events, commands, or alarms; and controlling, by the open application via the first connection, operation of the first industrial machine to control at least a first portion of the surface mounting process. The first industrial machine may be one of a stencil printer, a dispenser, a pick-and-place machine, a reflow oven, a wave solder machine, or a selective solder machine.

The operations may further include: opening a second connection between (a) the open application associated with the manufacturing execution system and (b) a second instance of the data sharing interface operating on a second industrial machine used in the surface mounting process; discovering, by the open application via the second connection, second discoverable information associated with the second industrial machine, the second discoverable information including one or more of data items, events, commands, or alarms; and controlling, by the open application via the second connection, operation of the second industrial machine to control at least a second portion of the surface mounting process. The first industrial machine and the second industrial machine may be provided by different manufacturers. The first industrial machine and the second industrial machine may be different kinds of machines.

Controlling operation of the first industrial machine may include setting a value of a data item defined in the first discoverable information, at least by transmitting the value of the data item to the first instance of the data sharing interface.

Controlling operation of the first industrial machine may include executing a command defined in the first discoverable information, at least by transmitting an instruction to execute the command to the first instance of the data sharing interface.

In general, in one aspect, a method for controlling at least part of a surface mounting process includes: opening a first connection between (a) an open application associated with a manufacturing execution system and (b) a first instance of a data sharing interface operating on a first industrial machine used in the surface mounting process, the open application being configured to communicate with any machine that implements the data sharing interface, regardless of machine type or manufacturer; discovering, by the open application via the first connection, first discoverable information associated with the first industrial machine, the first discoverable information including one or more of data items, events, commands, or alarms; and controlling, by the open application via the first connection, operation of the first industrial machine to control at least a first portion of the surface mounting process. The first industrial machine may be one of a stencil printer, a dispenser, a pick-and-place machine, a reflow oven, a wave solder machine, or a selective solder machine.

The method may further include: opening a second connection between (a) the open application associated with the manufacturing execution system and (b) a second instance of the data sharing interface operating on a second industrial machine used in the surface mounting process; discovering, by the open application via the second connection, second discoverable information associated with the second industrial machine, the second discoverable information including one or more of data items, events, commands, or alarms; and controlling, by the open application via the second connection, operation of the second industrial machine to control at least a second portion of the surface mounting process. The first industrial machine and the second industrial machine may be provided by different manufacturers. The first industrial machine and the second industrial machine may be different kinds of machines.

Controlling operation of the first industrial machine may include setting a value of a data item defined in the first discoverable information, at least by transmitting the value of the data item to the first instance of the data sharing interface.

Controlling operation of the first industrial machine may include executing a command defined in the first discoverable information, at least by transmitting an instruction to execute the command to the first instance of the data sharing interface.

One or more embodiments described in this Specification and/or recited in the claims may not be included in this General Overview section.

BRIEF DESCRIPTION OF THE DRAWINGS

Various aspects of at least one embodiment are discussed below with reference to the accompanying Figures, which are not intended to be drawn to scale. The Figures are included to provide illustration and a further understanding of the various aspects and embodiments, and are incorporated in and constitute a part of this specification, but are not intended to define the limits of the disclosure. In the Figures, each identical or nearly identical component that is illustrated in various Figures is represented by a like numeral. For the purposes of clarity, some components may not be labeled in every figure. In the Figures.

DETAILED DESCRIPTION

One or more embodiments include an open application interface (also referred to herein simply as an "interface," for ease of discussion) that allows for extracting data from and controlling industrial equipment. As used herein, the term "open" means standardized, so that any equipment implementing the interface can participate in the system, regardless of manufacturer. The interface may be implemented using a standardized communication protocol, such as JavaScript Object Notation Remote Procedure Call (JSON-RPC) 2.0 and/or another standardized communication protocol. Communication between devices may be secured, for example, using Transport Layer Security (TLS) and/or another cryptographic protocol. Thus, one or more embodiments include a secure, implementation-agnostic interface that allows for connecting applications to be written in various programming languages (e.g., C#, Java, Python, etc.). As described herein, the interface may be (a) self-describing, (b) universal, and (c) extendable.

Detailed examples are described herein for purposes of clarity. Components and/or operations described herein should be understood as examples that may not be applicable to one or more embodiments. Specifically, embodiments should not be considered limited to surface mounting equipment and/or processes. Similar techniques may be applied mutatis mutandis to other kinds of equipment and/or processes.

I. System Architecture

Figure 1:
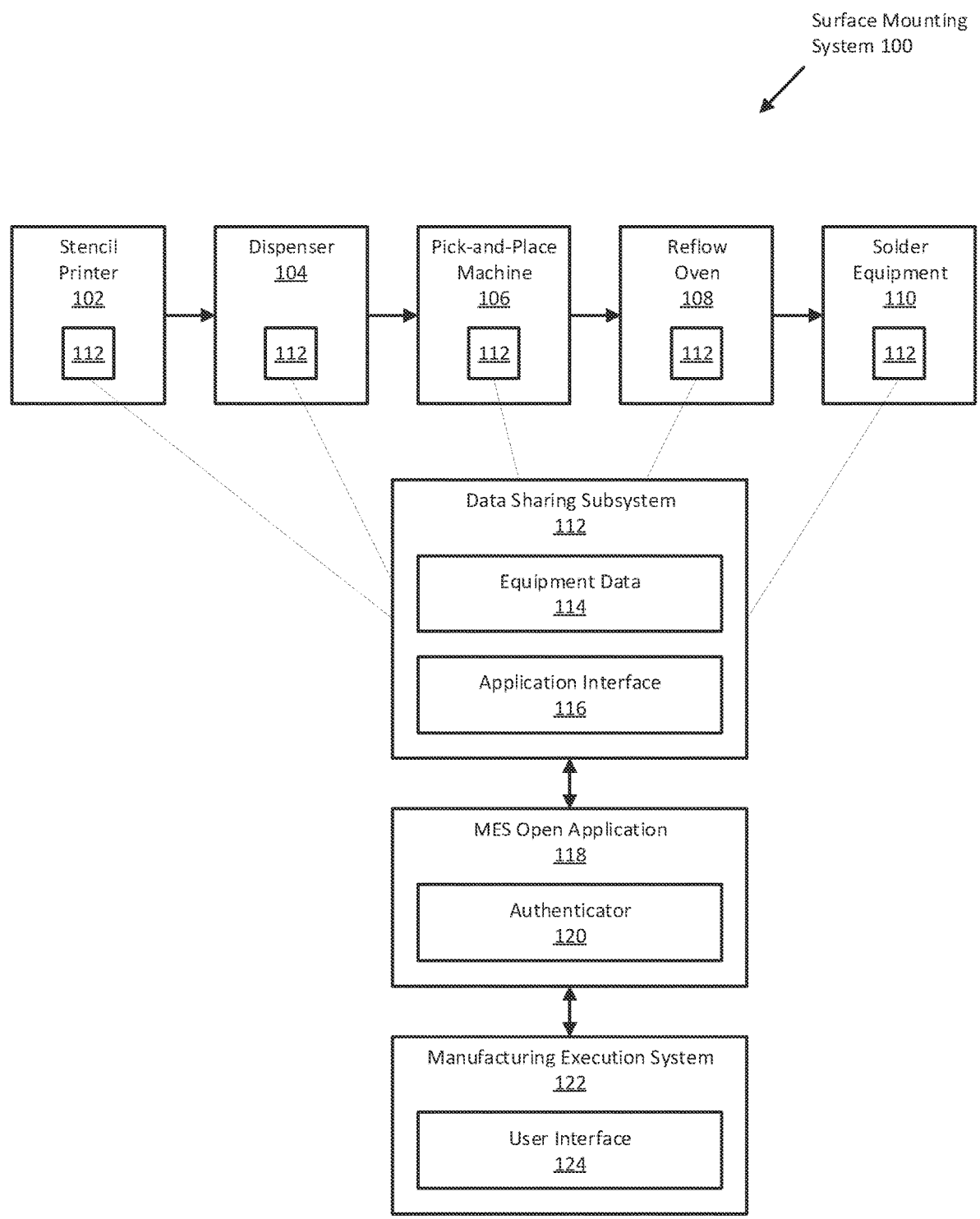
FIG. 1 is a block diagram of an example of a system according to an embodiment.

FIG. 1 is a block diagram of an example of a surface mounting system 100 according to an embodiment. In an embodiment, the surface mounting system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one example, a surface mounting process includes one or more of the following components and operations:

1. A stencil printer 102 may be provided to deposit solder paste onto a printed wiring board (PCB) by a stencil applied to the surface of the PCB. Alternatively or additionally, a dispenser 104 may be provided to deposit solder paste onto the PCB. For example, the stencil printer 102 may be an MPM® Edison™ or Momentum® II electronic assembly printer, and the dispenser 104 may be a Camalot® Prodigy® dispenser.
2. A pick-and-place machine 106 may be provided to place electrical components on the PCB at predefined locations coinciding with the applied solder paste.
3. The PCB may be transferred to a reflow oven 108, which causes the solder paste to reflow and thus solder the electrical components more securely to the PCB. For example, the reflow oven 108 may be a Vitronics Soltec Centurion™ reflow soldering oven.
4. Wave soldering and/or selective soldering equipment 110 may be provided to attach one or more electrical components to the PCB.

Notwithstanding the description above, it should be appreciated that many different surface mounting processes exist, using many different makes, models, and configurations of surface mounting equipment. For example, one or more stencil printers and dispensers may alternatively or additionally be used in other parts of the surface mounting system 100. Further, in addition to stencil printers, dispensers, pick-and-place machines, reflow ovens, wave and selective solder machines, the production line may include any other kind of equipment used in such lines—including, but not limited to, inspection equipment, stackers, conveyors, cleaners, and the like.

In an embodiment, one or more components of the surface mounting system 100 include(s) a respective data sharing subsystem 112. For example, the stencil printer 102 may include a data sharing subsystem 112 and the pick-and-place machine 106 may include another data sharing subsystem 112. In general, a data sharing subsystem 112 refers to hardware, software, and/or firmware configured to perform operations described herein for exposing an application interface 116 that allows for sharing equipment data 114 (i.e., data describing operating parameters of the equipment), discovering available capabilities of the equipment, and controlling the equipment using the available capabilities. For example, the application interface 116 may support messaging using JavaScript Object Notation Remote Procedure Calls (JSON-RPC) 2.0 and/or another messaging protocol.

Specifically, a data sharing subsystem 112 may be configured to communicate with a manufacturing execution system (MES) 122 via an MES open application 118. An MES 122 refers to hardware, software, and/or firmware configured to perform operations for managing the overall process using the equipment. For example, in a surface mounting system 100 such as that illustrated in FIG. 1, the MES 122 may manage operation of the stencil printer 102, dispenser 104, pick-and-place machine 106, reflow oven 108, and/or selective solder equipment 110, so that the equipment is used collectively to manufacture PCB-based electronics.

In an embodiment, the MES open application 118 also includes an instance of the data sharing subsystem 112. Including instances of the data sharing subsystem 112 in both the equipment and the MES open application 118 allows each component to operate as both server and client. The instance installed in the equipment may operate as a server with the MES open application 118 operating as a client; and the instance installed in the MES open application 118 may operates as a server with the equipment operating as a client. A two-instance configuration allows both the equipment and the MES open application 118 to transmit messages to, and obtain responses from, each other.

The MES 122 may include a user interface 124. In general, a user interface 124 refers to hardware and/or software configured to facilitate communications between a user and the MES 122, for example, to instruct the MES 122 to initiate, adjust, and/or terminate a surface mounting process. A user interface 124 renders user interface elements and receives input via user interface elements. A user interface 124 may be a graphical user interface (GUI), a command line interface (CLI), a haptic interface, a voice command interface, and/or any other kind of interface or combination thereof. Examples of user interface elements include checkboxes, radio buttons, dropdown lists, list boxes, buttons, toggles, text fields, date and time selectors, command lines, sliders, pages, and forms. Different components of a user interface 124 may be specified in different languages. The behavior of user interface elements may be specified in a dynamic programming language, such as JavaScript, and the content of user interface elements may be specified in a markup language, such as hypertext markup language (HTML), Extensible Markup Language (XML), or XML User Interface Language (XUL). The layout of user interface elements may be specified in a style sheet language, such as Cascading Style Sheets (CSS). Alternatively or additionally, aspects of a user interface 124 may be specified in one or more other languages, such as Java, Python, Perl, C, C++, and/or any other language or combination thereof.

In an embodiment, communication between components of the surface mounting system 100 uses Transport Layer Security (TLS) over Transmission Control Protocol/Internet Protocol (TCP/IP). Alternatively or additionally, another connection protocol may be used. Connections may be secured using TLS 1.1 and/or another cryptographic protocol. The data sharing subsystem(s) 112 and MES open application 118 may each operate as both a client and a server, using both client and server certificates. The MES open application 118 may include an authenticator 120 configured to authenticate, for a given connection, both the client and the server. Thus, the MES open application 118 may be configured to prevent unauthorized clients from connecting to the equipment.

In an embodiment, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

II. Installing and Using an Open Application Interface

Figure 2A:
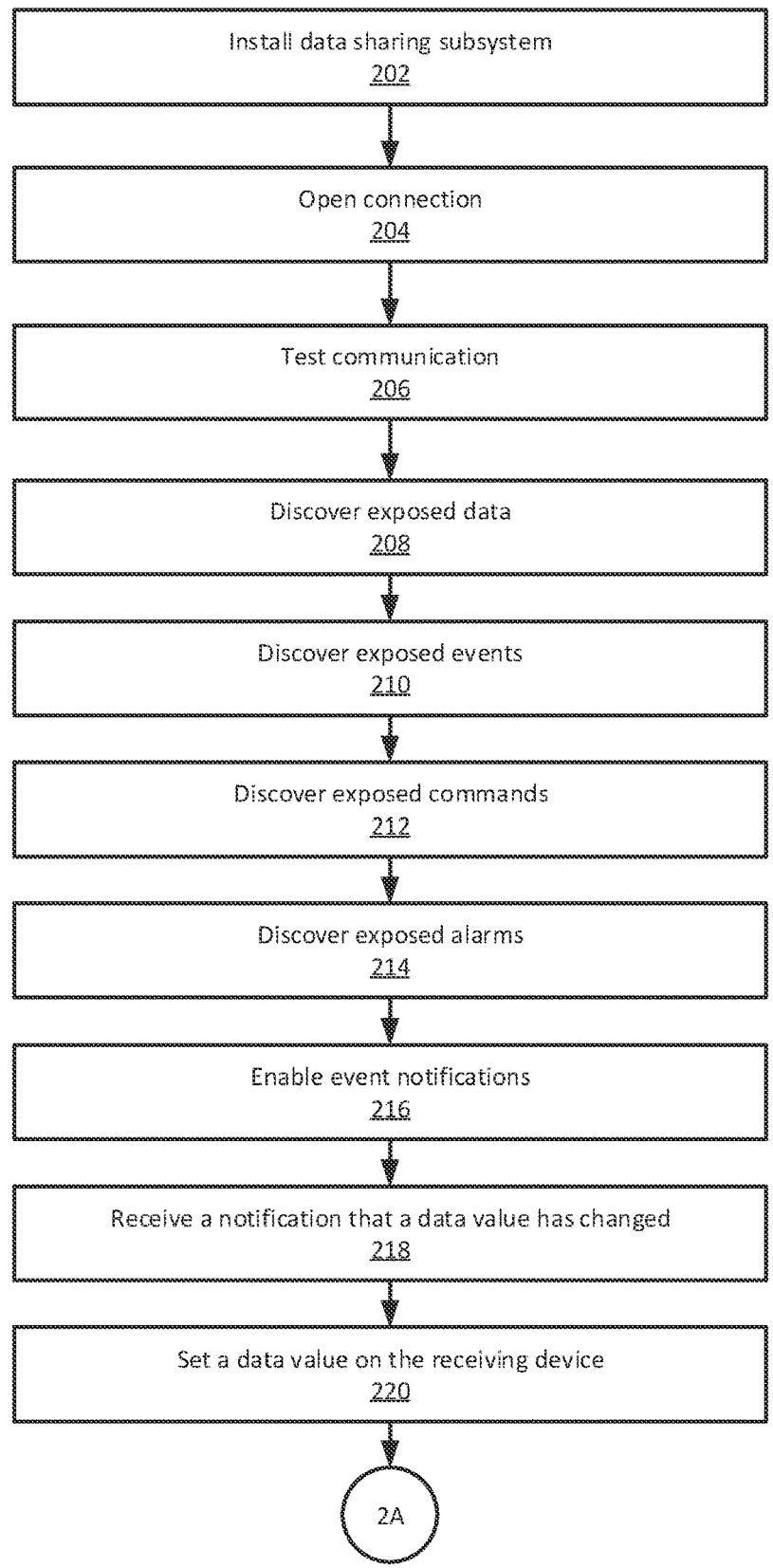
FIGS. 2A-2B are a flow diagram of an example of operations for installing and using an open application interface for industrial equipment according to an embodiment.
Figure 2B:
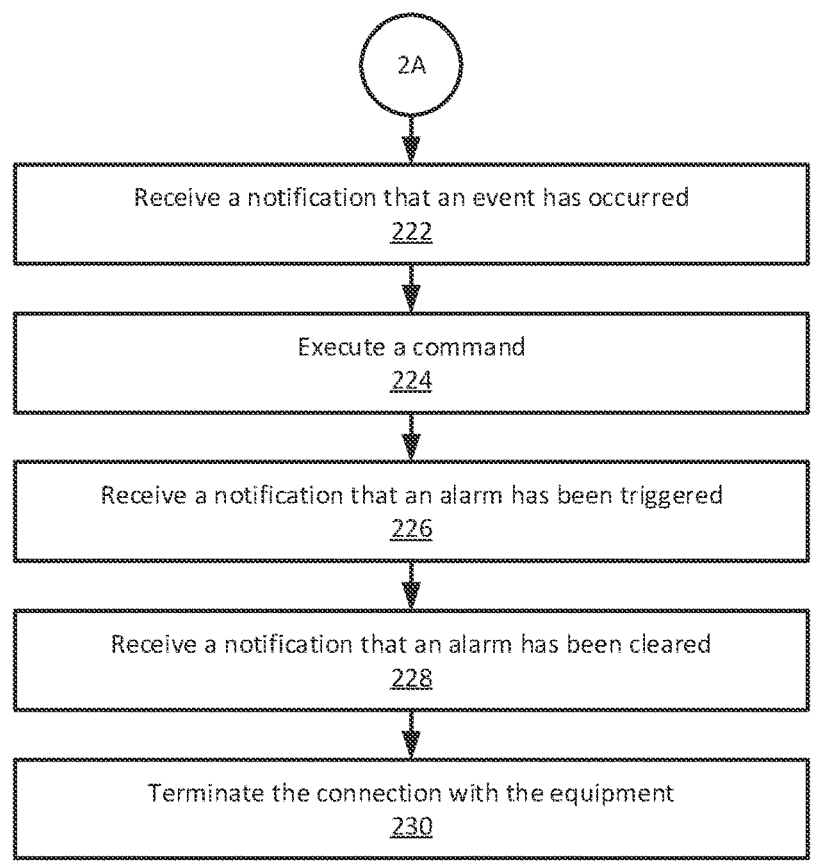

FIGS. 2A-2B are a flow diagram of an example of operations for installing and using an open application interface for industrial equipment according to an embodiment. One or more operations illustrated in FIGS. 2A-2B may be modified, rearranged, or omitted all together. Accordingly, the particular sequence of operations illustrated in FIGS. 2A-2B should not be construed as limiting the scope of one or more embodiments.

In the following discussion, some examples of message names and specifications are provided for illustrative purposes. These examples of message names and specification should not be construed as limiting the scope of one or more embodiments. In addition, in the following discussion, messages sent and/or received by equipment should be read as being sent and/or received by a data sharing subsystem installed on the equipment.

In an embodiment, an instance of a data sharing subsystem may be installed (Operation 202). Specifically, an instance of a data sharing subsystem may be installed on a piece of equipment, such as a piece of surface mounting equipment as described above. The equipment may be provided with the data sharing subsystem already installed. Alternatively, the data sharing subsystem may be installed on equipment that supports aftermarket hardware, software, and/or firmware add-ons. In the latter case, installing the data sharing subsystem adds open application support to equipment that previously did not have such support.

In addition, an instance of the data sharing subsystem may be installed on an MES open application. The system may include two instances of the same interface: one instance where the equipment operates as a server and the MES open application operates as a client; and another instance where the MES open application operates as a server and the equipment operates as a client. A two-instance configuration allows both the equipment and the MES open application to transmit messages to, and obtain responses from, each other.

An MES open application may open a connection with the equipment (Operation 204), or vice versa. Opening a connection may take the form of a "connect" message sent by the MES open application to the equipment, or by the equipment to the MES open application. The following is an example of a specification for a "connect" message according to an embodiment.

```
connect
Parameters
    name - name of the connecting open application
        required: true
        type: string
    ipv6 - Internet Protocol version 6 address of the computer the open application
    is running on
        required: true
        type: string
    port - endpoint port the open application will be listening on for calls made by
    the equipment
        required: true
        type: integer
    guid - assigned when a development license is purchased
        required: true
        type: string
Response
    "result" : "Success"
    In addition to the reserved JSON-RPC error codes, the following may be
    returned:
        "error" : {"code" : 10000, "message" : "Certificate authentication failure"}
        "error" : {"code" : 10001, "message" : "Not licensed by [provider]"}
        "error" : {"code" : 10002, "message" : "Open Application connection is
        not allowed in configuration"}
        "error" : {"code" : 10003, "message" : "Open Application already
        connected"}
```

The MES open application may test communication with the equipment, or vice versa (Operation 206). Testing communication may take the form of a "ping" message sent by the MES open application to the equipment, or by the equipment to the MES open application. Testing communication may not require that a connection first be established. The following is an example of a specification for a "ping" message according to an embodiment:

```
ping
Parameters
    None
Response
    "result" : "Success"
    In addition to the reserved JSON-RPC error codes, the following may be
    returned:
        "error" : {"code" : 10014, "message" : "Open App is not connected"}
```

The equipment and/or MES open application may discover data exposed by the receiving component (Operation 208). That is, the equipment may discover data exposed by the MES open application, or the MES open application may discover data exposed by the equipment. Data may be organized into groups, and optionally into subgroups. For example, the panel X dimension for the active process program may be stored as "processProgram\lineSet\0\x1." Subgroups may be nested, such as "processProgram\wiper\enabled." Some examples of data groups and subgroups according to an embodiment, which may be required to be supported by all equipment, are described in the examples below. Alternatively or additionally, the equipment may define one or more additional data items specific to its function(s).

Discovering data exposed by the equipment may take the form of a "getDataInfo" message. The following is an example of a specification for a "getDataInfo" message according to an embodiment:

```
getDataInfo
Parameters
   None
Response
   "result" : array of machineDataInfo
   "machineDataInfo" : {
     "type" : "object",
     "properties" : {
       "name"          : { "type" : "string"},
       "description"   : { "type" : "string" },
       "uniqueIntId"   : { "type" : "integer"},
       "units"         : { "enum" : [null, "mm", "degC", "kg", "sec",
                           "mmSec", "panels", "percent", "bar"] },
       "type"          : {"enum" : ["enum", "boolean", "integer",
                           "double", "string", "array", "object"]}
       "value"         : { "type" : "string" },
       "minimum"       : { "type" : "number" },
       "maximum"       : { "type" : "number" },
       "resolution"    : { "type" : "number" },
       "readOnly"      : { "type" : "boolean"}
     }
   }
   In addition to the reserved JSON-RPC error codes, the following may be
   returned:
     "error" : {"code" : 10014, "message" : "Open application is not
     connected"}
```

The equipment and/or MES open application may discover events exposed by the receiving component (Operation 210). That is, the equipment may discover events exposed by the MES open application, or the MES open application may discover events exposed by the equipment. Discovering events may take the form of a "getEventInfo" message. The following is an example of a specification for a "getEventInfo" message according to an embodiment:

```
getEventInfo
Parameters
   None
Response
   "result" : array of eventInfo
   "eventInfo" : {
     "type" : "object",
     "properties" : {
       "name"          : { "type" : "string"},
       "description"   : { "type" : "string"},
```

```
        "uniqueIntId"      : { "type" : integer },
        "eventParams"      : { "type" : array of machineDataInfo },
      }
    }
    In addition to the reserved JSON-RPC error codes, the following may be
returned:
        "error" : {"code" : 10014, "message" : "Open application is not
        connected"}
```

The equipment and/or MES open application may discover commands exposed by the receiving component (Operation 212). That is, the equipment may discover commands exposed by the MES open application, or the MES open application may discover commands exposed by the equipment. Discovering commands may take the form of a "getCommandInfo" message. The following is an example of a specification for a "getCommandInfo" message according to an embodiment:

```
getCommandInfo
Parameters
  None
Response
  "result" : array of commandInfo
  "commandInfo" : {
    "type" : "object",
    "properties" : {
      "name"           : { "type" : "string"},
      "description"    : { "type" : "string"},
      "uniqueIntId"    : { "type" : "integer" },
      "parameters"     : { "type" : "array of machineDataInfo" }
      "returns"        : { "type" : "string"}
    }
  }
  In addition to the reserved JSON-RPC error codes, the following may be
returned:
      "error" : {"code" : 10014, "message" : "Open application is not
      connected"}
```

The equipment and/or MES open application may discover alarms exposed by the receiving component (Operation 214). That is, the equipment may discover alarms exposed by the MES open application, or the MES open application may discover alarms exposed by the equipment. Discovering available alarms may take the form of a "getAlarmInfo" message. The following is an example of a specification for a "getAlarmInfo" message according to an embodiment:

```
getAlarmInfo
Parameters
  None
Response
  "result" : array of alarmInfo
  alarmInfo" : {
    "type" : "object",
    "properties" : {
      "name"           : { "type" : "string"},
      "description"    : { "type" : "string"},
      "uniqueIntId"    : { "type" : integer },
      "text"           : { "type" : string }
    }
  }
  In addition to the reserved JSON-RPC error codes, the following may be
returned:
      "error" : {"code" : 10014, "message" : "Open application is not
      connected"}
```

The equipment and/or MES open application may enable event notifications (Operation 216). That is, the equipment may enable notifications for discoverable events that occur on the MES open application, or the MES open application may enable notifications for discoverable events that occur on the equipment. Enabling event notifications may include enabling notifications of changed data values, triggered alarms, and/or cleared alarms. Enabling event notifications may be disabled by default. Enabling and disabling event notifications may use the same message, which may effectively serve as an enable/disable toggle. Enabling and/or disabling event notifications may take the form of an "enableEventNotifications" message. The following is an example of a specification for an "enableEventNotifications" message according to an embodiment:

```
enableEventNotifications
Parameters
    enableDisable - set true to enable all event notifications, false to disable
    notifications.
        required: true
        type: Boolean
Response
    "result" : "success"
    In addition to the reserved JSON-RPC error codes, the following may be
    returned:
        "error" : {"code" : 10008, "message" : "Specified event(s) do not exist",
        data : [names of failed events]}
        "error" : {"code" : 10014, "message" : "Open application is not
        connected"}
```

The equipment and/or MES open application may receive a notification that a data value (i.e., the value of a discoverable data item) has changed (Operation 218). That is, the equipment may receive a notification from the MES open application that a data value has changed in the MES open application, or the MES open application may receive a notification from the equipment that a data value has changed in the equipment. Notifying that a data value has changed may take the form of a "notifyValuesUpdated" message, which may notify a data "listener" of the value change. The following is an example of a specification for a "notifyValuesUpdated" message according to an embodiment:

```
notifyValuesUpdated

Parameters dataList - the list of names and values that have been updated.

required: true type: an array of objects where each object is a name value pair minimum size: 1

Response

"result" : "success"

In addition to the reserved JSON-RPC error codes, the following may be returned:

"error" : {"code" : 10014, "message" : "Open application is not connected"}
```

The equipment and/or MES open application may set a data value on the receiving component (Operation 220). That is, the equipment may set a data value on the MES open application, or the MES open application may set a data value on the equipment. In an embodiment, only data values that are not flagged as read-only can be set in this manner. Setting a data value may take the form of a "setDataValues" message. The following is an example of a specification for a "setDataValues" message according to an embodiment:

```
setDataValues
Parameters
   listOfNameValuePairs - the list of names and values that the caller wants to set
   (report names are not valid).
      required: true
      type: an array of objects where each object is a name value pair
      minimum size: 1
Response
   "result" : "success"
   In addition to the reserved JSON-RPC error codes, the following may be
   returned:
      "error" : {"code" : 10004, "message" : "Specified data item(s) do not
      exist", data : [names of failed data items]}
      "error" : {"code" : 10011, "message" : "Specified value(s) are not valid",
      data : [names of failed data items]}
      "error" : {"code" : 10014, "message" : "Open application is not
      connected"}
```

The equipment and/or MES open application may receive a notification that an event has occurred (Operation 222). That is, the equipment may receive a notification from the MES open application that an event has occurred on the MES open application, or the MES open application may receive a notification from the equipment that an event has occurred on the equipment. Determining that an event has occurred may take the form of receiving an "eventTriggered" message. The following is an example of a specification for an "eventTriggered" message according to an embodiment:

```
eventTriggered
Parameters
   eventName - name of the event
      required: true
      type: string
   dataList - an array of objects where each object is a data item name-value pair.
      required: false
      type: array of name value pairs
Response
   "result" : "success"
   In addition to the reserved JSON-RPC error codes, the following may be
returned:
      "error" : {"code" : 10014, "message" : "Open application is not
      connected"}
```

The equipment and/or MES open application may execute a command on the receiving component (Operation 224). That is, the equipment may execute a command on the MES open application, or the MES open application may execute a command on the equipment. Executing a command may take the form of an "executeCommand" message. The following is an example of a specification for an "executeCommand" message according to an embodiment:

```
executecommand
Parameters
   commandName - name of the command
      required: true
      type: string
```

```
parameterList - an array of name value pairs
   Required: false
   type: array of name value pairs
Response
   "result" : 0: cmdPerformed, 1: cmdNotExist, 2: cmdCannotPerform, 3:
   cmdParamInvalid, 4: cmdPerformLater, 5: cmdRejected, 6: cmdNoObject
   In addition to the reserved JSON-RPC error codes, the following may be
   returned:
      "error" : {"code" : 10012, "message" : "Specified command(s) do not
      exist", data : [names of failed command]}
      "error" : {"code" : 10013, "message" : "Access to command prohibited" }
      "error" : {"code" : 10014, "message" : "Open application is not
      connected"}
```

The equipment and/or MES open application may receive a notification that an alarm has been triggered (Operation 226). That is, the equipment may receive a notification from the MES open application indicating that an alarm has been triggered on the MES open application, or the MES open application may receive a notification from the equipment indicating that an alarm has been triggered on the equipment. A notification that an alarm has been triggered may take the form of receiving an "alarmTriggered" message. The following is an example of a specification for an "alarmTriggered" message according to an embodiment:

```
alarmTriggered
Parameters
   alarmText - alarm text
      required: true
      type: string
   instanceId - instance identifier
      Required: true
      type: int
   uniqueIntId - unique integer identifier
      Required: true
      type: int
Response
   "result" : "success"
   In addition to the reserved JSON-RPC error codes, the following may be
   returned:
      "error" : {"code" : 10014, "message" : "Open application is not
      connected"}
```

The equipment and/or MES open application may receive a notification that an alarm has been cleared (Operation 228). That is, the equipment may receive a notification from the MES open application indicating that an alarm has been cleared on the MES open application, or the MES open application may receive a notification from the equipment indicating that an alarm has been cleared on the equipment. A notification that an alarm has been cleared may take the form of receiving an "alarmCleared" message. The following is an example of a specification for an "alarmCleared" message according to an embodiment:

```
alarmCleared
Parameters
   instanceId - instance identifier
      Required: true
      type: int
   uniqueIntId - unique integer identifier
      Required: true
      type: int
Response
   "result" : "success"
```

In addition to the reserved JSON-RPC error codes, the following may be
returned:
  "error" : {"code" : 10014, "message" : "Open application is not
  connected"}

The equipment and/or MES open application may terminate the connection between the equipment and the MES open application (Operation 230). Terminating a connection may take the form of a "disconnect" message sent by the MES open application to the equipment, or by the equipment to the MES open application. The following is an example of a specification for a "disconnect" message according to an embodiment:

disconnect

Parameters
  None
Response
  "result" : "Success"
  In addition to the reserved JSON-RPC error codes, the following may be
  returned:
    "error" : {"code" : 10014, "message" : "Open application is not
    connected"}

Using operations described above, an MES open application may discover data, events, alarms, and commands exposed by industrial equipment. The MES open application may enable event notifications, so that the equipment knows the MES open application is ready to receive notifications of data changes, events, and/or alarm triggering. Then, on an ongoing basis, the MES open application may communicate with the equipment to receive notifications of updated data values, event and/or alarm triggers, and/or cleared events. To control the industrial process (e.g., surface mounting), the MES open application may execute commands on the equipment and set data values on the equipment. In an embodiment, this general workflow does not change if data, events, alarms, and/or commands are added or modified on the equipment—the interface and messaging process remain the same. In addition, the interface and messaging process are the same across all components that implement the open application architecture described herein.

III. Detailed Examples

The following are examples of messages according to an embodiment. These examples are provided for purposes of clarity. Components and/or operations described below should be understood as examples that may not be applicable to one or more embodiments. Accordingly, components and/or operations described below should not be construed as limiting the scope of one or more embodiments.

Connect. In an embodiment, when a client MES open application connects to equipment, it specifies its Internet Protocol (IP) address and port. Using this information, the equipment can establish a connection back to the MES open application, where the equipment is the client and the MES open application is the server. For example:

{"jsonrpc":"2.0","method":"connect","params":{"endpointPort":4012,"ipv6Address":"0:0:0:0:0:0:0:1","openAppGuid":"{E37C7E22-ECE2-4457-85D6-1CE6D2468446}","openAppName":"aGEM"},"id":1}

{"id":1,"jsonrpc":"2.0","result":"success"}

Ping. In an embodiment, a "ping" message allows either the equipment or the MES open application to validate that the connection is still active, and that the server side (equipment or MES open application, depending on the instance of the data sharing interface) is still active. For example:

```
{"jsonrpc":"2.0","method":"ping","params":null,"id":2}
{"id":2,"jsonrpc":"2.0","result":"success"}
```

Disconnect. In an embodiment, a "disconnect" message allows the equipment or MES open application to free up resources that are allocated to the connection. For example:

```
{"jsonrpc":"2.0","method":"disconnect","params":null,"id":3}
{"id":3,"jsonrpc":"2.0","result":"success"}
```

GetDataInfo. In an embodiment, a "GetDataInfo" message allows the client (equipment or MES open application, depending on the instance of the data sharing interface) to discover what data is provided by the server, and certain properties of the data. This approach allows the interface to be independent of equipment-specific data. For example:

```
{"jsonrpc":"2.0","method":"getDataInfo","params":null,"id":4}
{"id":4,"jsonrpc":"2.0", "result":
{[
    {
        "description": "List of all board Id's on the panel",
        "maximum": "100000000",
        "minimum": "0",
```

-continued

```
        "name": "BoardID",
        "readonly": "true",
        "resolution": "1",
        "type": "typeInt",
        "uniqueIntId": "40094",
        "units": "none",
        "validOnlyWithEvent": "true",
        "value": "0"
    },
    {
        "description": "Start pump chamber pressure",
        "maximum": "100.0",
        "minimum": "0.0",
        "name": "Measurement.PrintHead.StartChamberPressure",
        "readonly": "true",
        "resolution": "0.01",
        "type": "typeDouble",
        "uniqueIntId": "20003",
        "units": "bar",
        "validOnlyWithEvent": "false",
        "value": "0.0"
    }
]}
}
```

GetEventInfo. In an embodiment, a "GetEventInfo" message allows the client (equipment or MES open application, depending on the instance of the data sharing interface) to discover what events are provided by the server, as well as data associated with each event. This approach allows the interface to be independent of equipment-specific events. For example:

```
{"jsonrpc":"2.0","method":"getEventInfo","params":null,"id":5}
{"id":5,"jsonrpc":"2.0","result":
{[
    {
        "description": "Machine state changed from Paused With Error to Processing",
        "eventParams": null,
        "name": "MachinestateChangePausedWithErrorToProcessing",
        "uniqueIntId": "52091"
    },
    {
        "description": "Machine state changed from Stopping to Paused",
        "eventParams": null,
        "name": "MachinestateChangeStoppingToPaused",
        "uniqueIntId": "52064"
    },
    {
        "description": "A process program (recipe) has been created changed or deleted",
        "eventParams": [
            {
                "description": "Name of the process program (recipe) created edited or deleted",
                "maximum": "",
                "minimum": "",
                "name": "PPChangeName",
                "readonly": "true",
                "resolution": "",
                "type": "typeString",
                "uniqueIntId": "40103",
                "units": "none",
                "validOnlyWithEvent": "true",
                "value": ""
            },
            {
                "description": "Process program change tpe (1=created 2=edited 3=deleted)",
                "maximum": "3",
                "minimum": "1",
                "name": "PPChangeStatus",
                "readonly": "true",
                "resolution": "1",
```

```
        "type": "typeEnum",
        "uniqueIntId": "40104",
        "units": "none",
        "validOnlyWithEvent": "true",
        "value": "1"
      }
    ],
    "name": "PPChange",
    "uniqueIntId": "50054"
  },
  {
    "description": "Downstream machine ready/not ready event",
    "eventParams": [
      {
        "description": "Downstream machine ready/not ready"
        "maximum":
        "minimum":
        "name": "DownstreamReady",
        "readonly": "true",
        "resolution": "0",
        "type": "typeBool",
        "uniqueIntId": "40039",
        "units": "none",
        "validOnlyWithEvent": "true",
        "value": "false"
      }
    ],
    "name": "DownstreamMachineReady",
    "uniqueIntId": "50032"
  },
]}
}
```

GetCommandInfo. In an embodiment, a "GetCommandInfo" message allows the client (equipment or MES open application, depending on the instance of the data sharing interface) to discover what commands are provided by the server, as well as parameters associated with each command. This approach allows the interface to be independent of equipment-specific commands. For example:

```
{"jsonrpc":"2.0","method":"getCommandInfo","params":null,"id":6}
{"id":6,"jsonrpc":"2.0","result":
{[
  {
    "description": "Instructs the equipment to stop processing",
    "eventParams": null,
    "name": "STOP",
    "uniqueIntId": "70002"
  },
  {
    "description": "Instructs the equipment to initiate processing",
    "eventParams": null,
    "name": "START",
    "uniqueIntId": "70001"
  },
  {
    "description": "Suspend processing temporarily at the next safe break point",
    "eventParams": null,
    "name": "PAUSE",
    "uniqueIntId": "70003"
  },
  {
    "description": "Command to resume processing from the point where the process was paused",
    "eventParams": null,
    "name": "RESUME",
    "uniqueIntId": "70004"
  },
  {
    "description": "Command to start a wipe",
    "eventParams": null,
    "name": "WIPE-NOW",
    "uniqueIntId": "70006"
  },
```

```
{
    "description": "Command to terminate the current cycle prior to its completion",
    "eventParams": null,
    "name": "ABORT",
    "uniqueIntId": "70005"
},
{
    "description": "Loads a process program on the machine",
    "eventParams": [
        {
            "description": "Process Program Name",
            "maximum": "",
            "minimum": "",
            "name": "PPExecName",
            "readonly": "true",
            "resolution": "",
            "type": "typeString",
            "uniqueIntId": "40009",
            "units": "none",
            "value": ""
        }
    ],
    "name": "PP-SELECT",
    "uniqueIntId": "70000"
}
]}
}
```

GetAlarmInfo. In an embodiment, a "GetAlarmInfo" message allows the client (equipment or MES open application, depending on the instance of the data sharing interface) to discover what alarms are provided by the server. This approach allows the interface to be independent of equipment-specific alarms. For example:

```
{"jsonrpc":"2.0","method":"getAlarmInfo","params":null,"id":7}
{"id":7,"jsonrpc":"2.0", "result":
{[
    {
        "description": "Wiper speed is out of range",
        "name": "WiperSpeedOutOfRange",
        "text": "Wiper speed is out of range",
        "uniqueIntId": "60166"
    },
    {
        "description": "Remove and clean stencil timer has expired",
        "name": "RemoveAndCleanStencil",
        "text": "Remove and clean stencil timer has expired",
        "uniqueIntId": "60163"
    }
]}
}
```

SetDataValues. In an embodiment, a "SetDataValues" message allows the client (equipment or MES open application, depending on the instance of the data sharing interface) to set the value of data on the server. Specifying name/value pairs allows the interface to be independent of equipment-specific data. For example:

```
{"jsonrpc":"2.0","method":"setDataValues","params":{"listOfNameValuePairs":[{ "ProcessProgram.Lane.TransportSpeed":254.0}]},"id":8}
{"id":8,"jsonrpc":"2.0","result":"success"}
```

EnableEventNotifications:

```
{"jsonrpc":"2.0", "method":"enableEventNotifications","params": {"enableDisable":true}
,"id":9}
{"id":9,"jsonrpc":"2.0","result":"success"}
```

ExecuteCommand. In an embodiment, an "ExecuteCommand" message allows the client (equipment or MES open application, depending on the instance of the data sharing interface) to execute a command on the server. Specifying a command name and passing the parameter list as name/value pairs allows the interface to be independent of equipment-specific commands. For example:

```
{"jsonrpc":"2.0","method":"executeCommand","params":{"commandName":"PP-SELECT","parameterList":[{"PPExecName":"Demo"}]},"id":10}
{"id":10,"jsonrpc":"2.0","result":"0"}
CommandResults:
0: cmdPerformed, 1: cmdNotExist, 2: cmdCannotPerform, 3: cmdParamInvalid, 4:
cmdPerformLater, 5: cmdRejected, 6: cmdNoObject
```

EventTriggered. In an embodiment, an "EventTriggered" message allows the client (equipment or MES open application, depending on the instance of the data sharing interface) to notify the server when an event occurs. Specifying the event name and passing the data as name/value pairs allows the interface to be independent of equipment-specific events. For example:

```
{"id":11,"jsonrpc":"2.0","method":"eventTriggered","params":{"dataList":[{"AlarmState": 0}],"eventName":"AlarmStateChange"}}
{"jsonrpc":"2.0","result":"success","id":11}
Intueri user Set/Save ProcessProgram
{"id":12,"jsonrpc":"2.0","method":"eventTriggered","params":{"dataList":[{"ParameterChangeName":"Modified"},{"ParameterChangeOldValue":"08/13/2020
14:55:51"},{"ParameterChangeNewValue":"08/13/2020
14:57:04"}],"eventName":"ProcessProgramParameterChanged"}}
{"jsonrpc":"2.0","result":"success","id":12}
Intueri user Set/Save ProcessProgram Parameters BoardXSize from 440 to 445.
{"id": 13, "jsonrpc":"2.0","method":"eventTriggered","params":{"dataList":[{"ParameterChangeName":"BoardXSize"},{"ParameterChangeOldValue":"440"},{"ParameterChangeNewValue":"445"}],"eventName":"ProcessProgramParameterChanged"}}
{"jsonrpc":"2.0","result":"success","id":13}
{"id":14,"jsonrpc":"2.0","method":"eventTriggered","params":{"dataList":[{"PPChangeName":"LLDemo"},{"PPChangeStatus":2}],"eventName":"PPChange"}}
{"jsonrpc":"2.0","result":"success","id":14}
{"id":15,"jsonrpc":"2.0","method":"eventTriggered","params":{"dataList":null,"eventName":"MachineStateChangeReadyToNotReady"}}
{"jsonrpc":"2.0","result":"success","id":15}
Intueri User Load stencil:
{"id":16,"jsonrpc":"2.0","method":"eventTriggered","params":{"dataList":[{"ProcessStateString":"eSysMS Ready"},{"ProcessState":4},{"PreviousProcessState":3}],"eventName":"ProcessingStateChanged"}}
{"jsonrpc":"2.0","result":"success","id":16}
{"id": 17,"jsonrpc":"2.0","method":"eventTriggered","params":{"dataList":null,"eventName":"StencilInsertedNotification"}}
{"jsonrpc":"2.0","result":"success","id":17}
```

AlarmCleared. In an embodiment, an "AlarmCleared" message allows the client (equipment or MES open application, depending on the instance of the data sharing interface) to notify the server when an alarm is cleared. Specifying the alarm instance ID allows the interface to be independent of equipment-specific alarms. For example:

```
{"id": 18,"jsonrpc":"2.0","method":"alarmCleared","params":{"instanceId":1757,"uniqueIntId":60160}}
{"jsonrpc":"2.0","result":"success","id":18}
```

AlarmTriggered. In an embodiment, an "AlarmTriggered" message allows the client (equipment or MES open application, depending on the instance of the data sharing interface) to notify the server when an alarm is triggered. Specifying the alarm instance ID and associated alarm text allows the interface to be independent of equipment-specific alarms. For example:

```
{"id":19,"jsonrpc":"2.0","method":"alarmTriggered","params":{"alarmText":"Wiper
solvent is low","instanceId":1817,"uniqueIntId":60160}}
{"jsonrpc":"2.0","result":"success","id":19}
```

NotifyValuesUpdated. In an embodiment, a "NotifyValuesUpdated" message allows the client (equipment or MES open application, depending on the instance of the data sharing interface) to notify the server that one or more data values has/have been updated. Specifying name/value pairs allows the interface to be independent of equipment-specific data. For example:

```
{"id":20,"jsonrpc":"2.0","method":"notifyValuesUpdated","params":{"dataList":[{"Pro
cessProgram.Dispenser.AutoEnabled":"True"}]}}
{"jsonrpc":"2.0","result":"success","id":20}
```

IV. General; Computer Systems; Networking

In an embodiment, a system includes one or more devices, including one or more hardware processors, that are configured to perform any of the operations described herein and/or recited in any of the claims.

In an embodiment, one or more non-transitory computer-readable storage media store instructions that, when executed by one or more hardware processors, cause performance of any of the operations described herein and/or recited in any of the claims.

Any combination of the features and functionalities described herein may be used in accordance with an embodiment. In the foregoing specification, embodiments have been described with reference to numerous specific details that may vary from implementation to implementation. Accordingly, the specification and figures are to be regarded in an illustrative rather than a restrictive sense. The sole and exclusive indicator of the scope of the invention, and what is intended by the Applicant to be the scope of the invention, is the literal and equivalent scope of the set of claims that issue from this application, in the specific form in which such claims issue, including any subsequent correction.

In an embodiment, techniques described herein are implemented by one or more special-purpose computing devices (i.e., computing devices specially configured to perform certain functionality). The special-purpose computing device(s) may be hard-wired to perform the techniques and/or may include digital electronic devices such as one or more application-specific integrated circuits (ASICs), field programmable gate arrays (FPGAs), and/or network processing units (NPUs) that are persistently programmed to perform the techniques. Alternatively or additionally, a computing device may include one or more general-purpose hardware processors programmed to perform the techniques pursuant to program instructions in firmware, memory, and/or other storage. Alternatively or additionally, a special-purpose computing device may combine custom hard-wired logic, ASICs, FPGAs, or NPUs with custom programming to accomplish the techniques. A special-purpose computing device may include a desktop computer system, portable computer system, handheld device, networking device, and/or any other device(s) incorporating hard-wired and/or program logic to implement the techniques.

Figure 3:
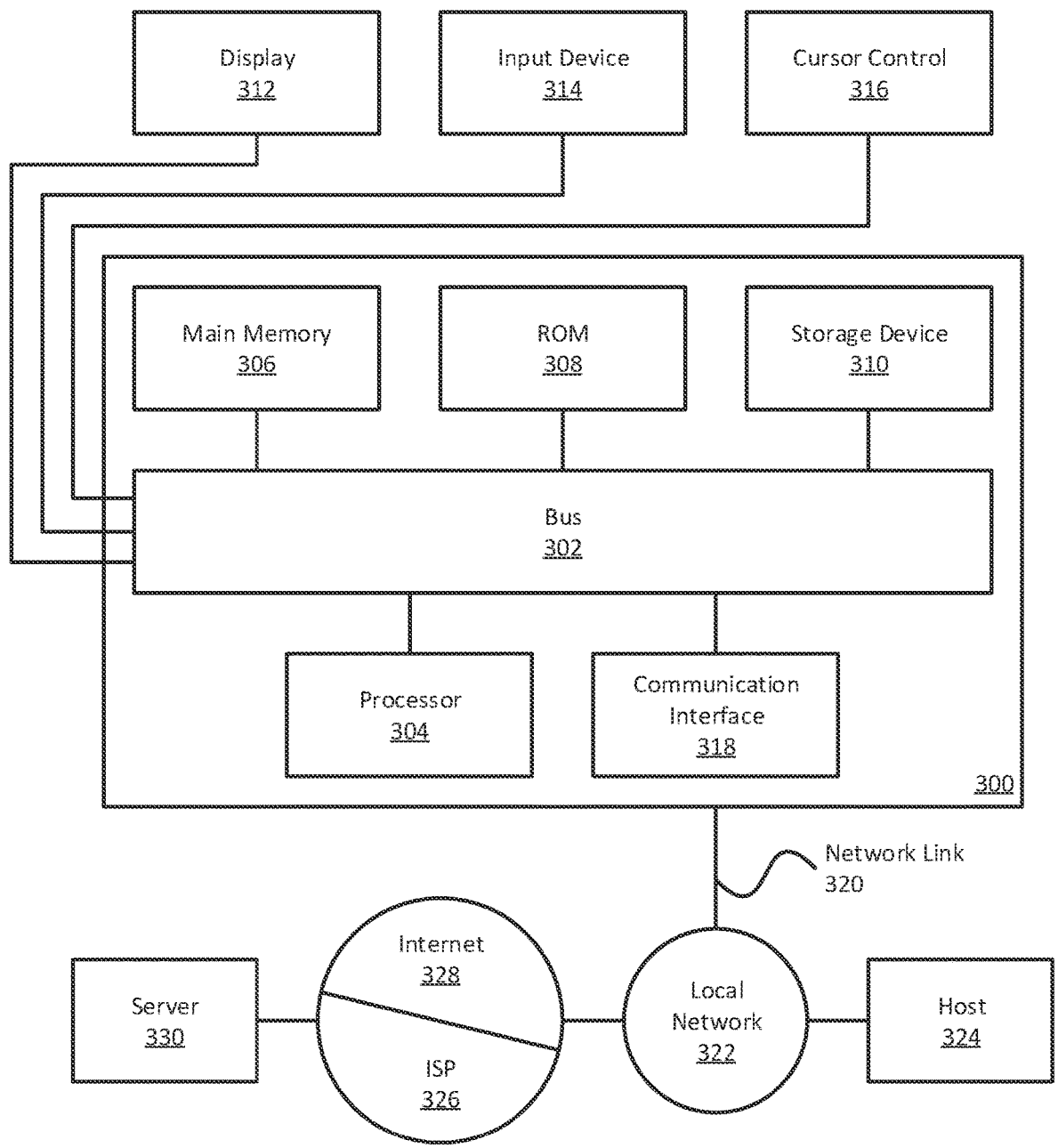
FIG. 3 is a block diagram of an example of a computer system according to an embodiment.

For example, FIG. 3 is a block diagram of an example of a computer system 300 according to an embodiment. Computer system 300 includes a bus 302 or other communication mechanism for communicating information, and a hardware processor 304 coupled with the bus 302 for processing information. Hardware processor 304 may be a general-purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in one or more non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a liquid crystal display (LCD), plasma display, electronic ink display, cathode ray tube (CRT) monitor, or any other kind of device for displaying information to a computer user. An input device 314, including alphanumeric and other keys, may be coupled to bus 302 for communicating information and command selections to processor 304. Alternatively or additionally, computer system 300 may receive user input via a cursor control 316, such as a mouse, a trackball, a trackpad, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane. Alternatively or additionally, computer system 3 may include a touchscreen. Display 312 may be configured to receive user input via one or more pressure-sensitive sensors, multi-touch sensors, and/or gesture sensors. Alternatively or additionally, computer system 300 may receive user input via a microphone, video camera, and/or some other kind of user input device (not shown).

Computer system 300 may implement the techniques described herein using customized hard-wired logic, one or more ASICs or FPGAs, firmware, and/or program logic which in combination with other components of computer system 300 causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. Alternatively or additionally, hard-wired circuitry may be used in place of or in combination with software instructions.

The term "storage media" as used herein refers to one or more non-transitory media storing data and/or instructions that cause a machine to operate in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape or other magnetic data storage medium, a CD-ROM or any other optical data storage medium, any physical medium with patterns of holes, a RAM, a programmable read-only memory (PROM), an erasable PROM (EPROM), a FLASH-EPROM, non-volatile random-access memory (NVRAM), any other memory chip or cartridge, content-addressable memory (CAM), and ternary content-addressable memory (TCAM).

A storage medium is distinct from but may be used in conjunction with a transmission medium. Transmission media participate in transferring information between storage media. Examples of transmission media include coaxial cables, copper wire, and fiber optics, including the wires that comprise bus 302. Transmission media may also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer may load the instructions into its dynamic memory and send the instructions over a network, via a network interface controller (NIC), such as an Ethernet controller or Wi-Fi controller. A NIC local to computer system 300 may receive the data from the network and place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322, and communication interface 318.

The received code may be executed by processor 304 as it is received, and/or stored in storage device 310, or other non-volatile storage for later execution.

In an embodiment, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (for example, a request to execute a particular application and/or retrieve a particular set of data). A server process responds by executing the requested service and/or returning corresponding data.

A computer network may be a physical network, including physical nodes connected by physical links. A physical node is any digital device. A physical node may be a function-specific hardware device. Examples of function-specific hardware devices include a hardware switch, a hardware router, a hardware firewall, and a hardware NAT. Alternatively or additionally, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (for example, a physical network). Each node in an overlay network corresponds to a respective node in the underlying network. Accordingly, each node in an overlay network is associated with both an overlay address (to address the overlay node) and an underlay address (to address the underlay node that implements the overlay node). An overlay node may be a digital device and/or a software process (for example, a virtual machine, an application instance, or a thread). A link that connects overlay nodes may be implemented as a tunnel through the underlying network. The overlay nodes at either end of the tunnel may treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources may be shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). In a hybrid cloud, a computer network includes a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, a system supports multiple tenants. A tenant is a corporation, organization, enterprise, business unit, employee, or other entity that accesses a shared computing resource (for example, a computing resource shared in a public cloud). One tenant (through operation, tenant-specific practices, employees, and/or identification to the external world) may be separate from another tenant. The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In an embodiment, in a multi-tenant computer network, tenant isolation is implemented to ensure that the applications and/or data of different tenants are not shared with each other. Various tenant isolation approaches may be used. In an embodiment, each tenant is associated with a tenant ID. Applications implemented by the computer network are tagged with tenant ID's. Additionally or alternatively, data structures and/or datasets, stored by the computer network, are tagged with tenant ID's. A tenant is permitted access to a particular application, data structure, and/or dataset only if the tenant and the particular application, data structure, and/or dataset are associated with a same tenant ID. As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants. A subscription list may indicate which tenants have authorization to access which applications. For each application, a list of tenant ID's of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels may be used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

What is claimed is:

1. One or more non-transitory computer-readable media storing instructions that, when executed by one or more processors of a computing device, cause the one or more processors to perform operations for controlling at least part of a surface mounting process, the operations comprising:

opening a connection between (a) an open application, running on the computing device, associated with a manufacturing execution system and (b) an instance of a data sharing interface operating on an industrial machine used in the surface mounting process, the open application being configured to communicate with any machine that implements the data sharing interface, regardless of machine type and manufacturer, the industrial machine being external to the computing device;

sending, by the open application via the connection, a request message from the computing device to the industrial machine, the request message requesting a list of commands that are eligible to be executed on the industrial machine;

receiving, by the open application from the industrial machine via the connection, in response to the request message, the list of commands available to be executed on the industrial machine, the list of commands including properties and parameters of each command of the list of commands;

controlling, by the open application via the connection, operation of the industrial machine to control at least a portion of the surface mounting process by causing a command defined in the received list of commands to be executed, at least by transmitting an instruction to execute the command to the industrial machine via the instance of the data sharing interface.

2. The one or more non-transitory computer-readable media of claim 1, the operations further comprising:

opening another connection between (a) the open application associated with the manufacturing execution system and (b) another instance of the data sharing interface operating on another industrial machine used in the surface mounting process, the other industrial machine being external to the computing device and the industrial machine;

sending, by the open application via the other connection, another request message to the other industrial machine, the other request message requesting another list of commands available to be executed on the other industrial machine;

receiving, by the open application from the other industrial machine via the other connection, in response to the other request message, the other list of commands available to be executed on the other industrial machine, the other list of commands including other properties and parameters of each command of the other list of commands; and controlling, by the open application via the other connection, operation of the other industrial machine to control at least another portion of the surface mounting process.

3. The one or more non-transitory computer-readable media of claim 2, the industrial machine and the other industrial machine being provided by different manufacturers.

4. The one or more non-transitory computer-readable media of claim 2, the industrial machine and the other industrial machine being different kinds of machines.

5. The one or more non-transitory computer-readable media of claim 1, the industrial machine being one of a stencil printer, a dispenser, a pick-and-place machine, a reflow oven, a wave solder machine, or a selective solder machine.

6. A system for controlling at least part of a surface mounting process, comprising:

at least one device including a hardware processor;

the system being configured to perform operations for controlling at least part of the surface mounting process, the operations comprising:

opening a connection between (a) an open application, running on the at least one device, associated with a manufacturing execution system and (b) an instance of a data sharing interface operating on an industrial machine used in a surface mounting process, the open application being configured to communicate with any machine that implements the data sharing interface, regardless of machine type and manufacturer, the industrial machine being external to the at least one device;

sending, by the open application via the connection, a request message from the at least one device to the industrial machine, the request message requesting a list of commands that are eligible to be executed on the industrial machine;

receiving, by the open application from the industrial machine via the connection, in response to the request message, the list of commands available to be executed on the industrial machine, the list of commands including properties and parameters of each command of the list of commands;

controlling, by the open application via the connection, operation of the industrial machine to control at least a portion of the surface mounting process by causing a command defined in the received list of commands to be executed, at least by transmitting an instruction to execute the command to the industrial machine via the instance of the data sharing interface.

7. The system of claim 6, the operations further comprising:

opening another connection between (a) the open application associated with the manufacturing execution system and (b) another instance of the data sharing interface operating on another industrial machine used in the surface mounting process, the other industrial machine being external to the at least one device and the industrial machine;

sending, by the open application via the other connection, another request message to the other industrial machine, the other request message requesting another list of commands available to be executed on the other industrial machine;

receiving, by the open application from the other industrial machine via the other connection, in response to the other request message, the other list of commands available to be executed on the other industrial machine, the other list of commands including other properties and parameters of each command of the other list of commands; and controlling, by the open application via the other connection, operation of the other industrial machine to control at least another portion of the surface mounting process.

8. The system of claim 7, the industrial machine and the other industrial machine being provided by different manufacturers.

9. The system of claim 7, the industrial machine and the other industrial machine being different kinds of machines.

10. The system of claim 6, the industrial machine being one of a stencil printer, a dispenser, a pick-and-place machine, a reflow oven, a wave solder machine, or a selective solder machine.

11. A method, performed by a computing device, for controlling at least part of a surface mounting process, comprising:

opening a connection between (a) an open application, running on the computing device, associated with a manufacturing execution system and (b) an instance of a data sharing interface operating on an industrial machine used in the surface mounting process, the open application being configured to communicate with any machine that implements the data sharing interface, regardless of machine type and manufacturer, the industrial machine being external to the computing device;

sending, by the open application via the connection, a request message from the computing device to the industrial machine, the request message requesting a list of commands that are eligible to be executed on the industrial machine;

receiving, by the open application from the industrial machine via the connection, in response to the request message, the list of commands available to be executed on the industrial machine, the list of commands including properties and parameters of each command of the list of commands;

controlling, by the open application via the connection, operation of the industrial machine to control at least a portion of the surface mounting process by causing a command defined in the received list of commands to be executed, at least by transmitting an instruction to execute the command to the industrial machine via the instance of the data sharing interface.

12. The method of claim 11, further comprising:

opening another connection between (a) the open application associated with the manufacturing execution system and (b) another instance of the data sharing interface operating on another industrial machine used in the surface mounting process, the other industrial machine being external to the computing device and the industrial machine;

sending, by the open application via the other connection, another request message to the other industrial machine, the other request message requesting another list of commands available to be executed on the other industrial machine;

receiving, by the open application from the other industrial machine via the other connection, in response to the other request message, the other list of commands available to be executed on the other industrial machine, the other list of commands including other properties and parameters of each command of the other list of commands; and controlling, by the open application via the other connection, operation of the other industrial machine to control at least another portion of the surface mounting process.

13. The method of claim 12, the industrial machine and the other industrial machine being provided by different manufacturers.

14. The method of claim 12, the industrial machine and the other industrial machine being different kinds of machines.

* * * * *

UNITED STATES PATENT AND TRADEMARK OFFICE
CERTIFICATE OF CORRECTION

PATENT NO.        : 12,259,715 B2
APPLICATION NO.   : 17/511735
DATED             : March 25, 2025
INVENTOR(S)       : Michael E. Donelan et al.

Page 1 of 1

It is certified that error appears in the above-identified patent and that said Letters Patent is hereby corrected as shown below:

In the Claims

Column 35, Line 35, Claim 1, insert -- and -- after "commands;"

Column 36, Line 39, Claim 6, insert -- and -- after "commands;"

Column 37, Line 37, Claim 11, insert -- and -- after "commands;"

Signed and Sealed this
Twenty-second Day of April, 2025

Coke Morgan Stewart
*Acting Director of the United States Patent and Trademark Office*